United States Patent [19]

Uekusa

[11] 4,240,017
[45] Dec. 16, 1980

[54] CONTROL METHOD IN AN INTERMITTENTLY MOVING MECHANISM AND A SHIFT REGISTER FOR CARRYING OUT THE METHOD

[75] Inventor: Hiroshi Uekusa, Chiba, Japan
[73] Assignee: Yoshino Kogyosho Co., Ltd., Japan
[21] Appl. No.: 817,684
[22] Filed: Jul. 21, 1977
[51] Int. Cl.[2] ............................................. G05B 19/26
[52] U.S. Cl. .................................... 318/600; 209/565
[58] Field of Search .......................... 209/565; 310/49; 235/92 SH; 307/221 R; 318/600, 603

[56] References Cited

U.S. PATENT DOCUMENTS

| 2,754,699 | 7/1956 | Pulman | 74/436 |
|---|---|---|---|
| 2,979,971 | 4/1961 | Darash | 74/436 |
| 3,757,940 | 9/1973 | Damm | 209/565 |
| 3,941,686 | 3/1976 | Juvinall | 209/565 |
| 3,975,261 | 8/1976 | Beck | 209/565 |

Primary Examiner—J. V. Truhe
Assistant Examiner—Eugene S. Indyk
Attorney, Agent, or Firm—Fidelman, Wolffe & Waldron

[57] ABSTRACT

The present invention discloses a control method, and a shift register for carrying out the control method, for use with an intermittently moving mechanism designed to automatically perform various inspections and operations with respect to a product, wherein the inspection result signals and/or operation instruction signals are placed in correspondence to a plurality of successively fed products, and wherein exterior instruction signals may be entered at suitable times, and wherein a plurality of different inspection result signals and/or operation instruction signals may be issued by a single device. These inspection result signals and operation instruction signals may or may not be shifted to other inspection and operation positions to thereby use the mechanism in a variety of modes.

7 Claims, 2 Drawing Figures

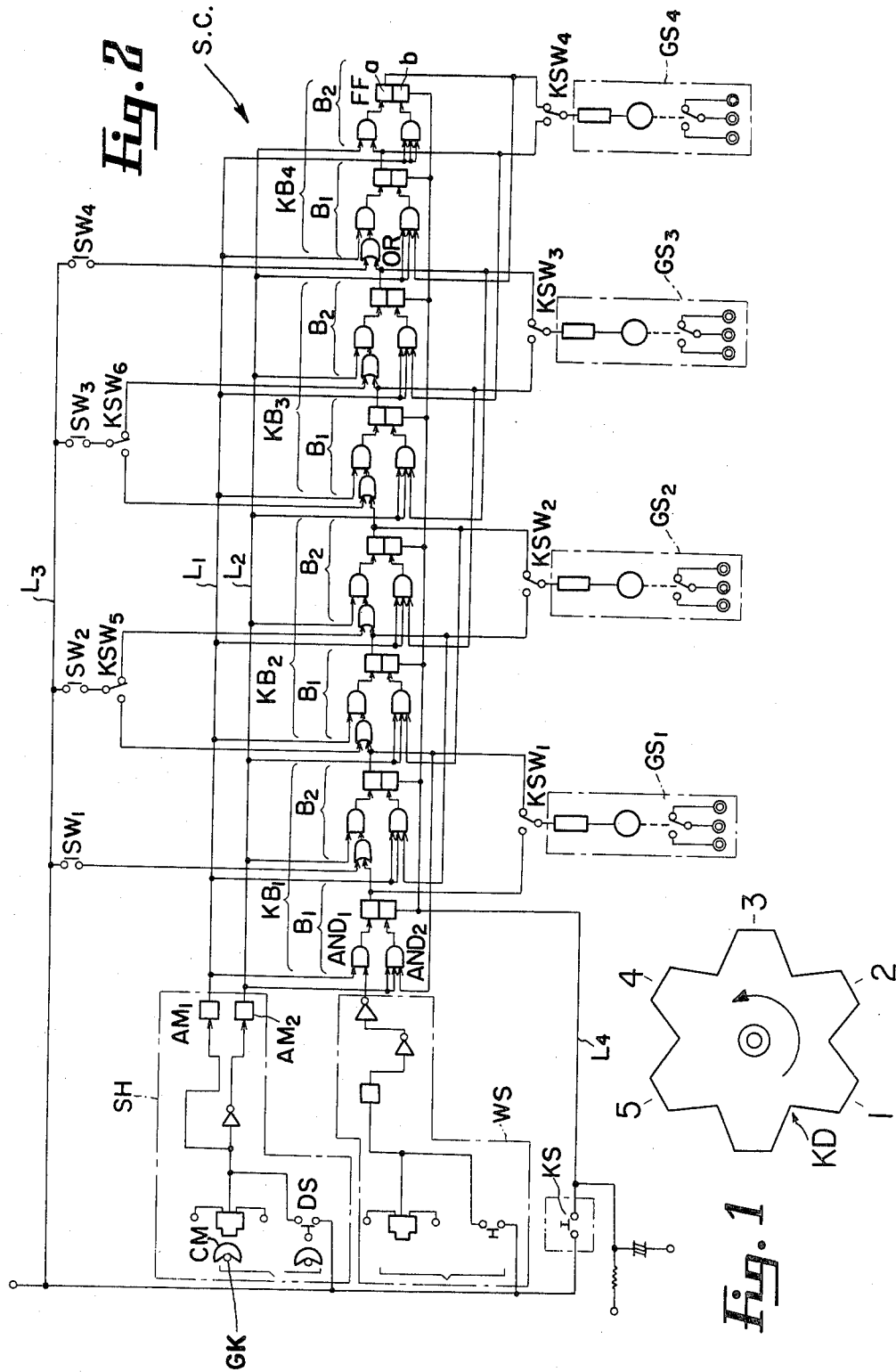

CONTROL METHOD IN AN INTERMITTENTLY MOVING MECHANISM AND A SHIFT REGISTER FOR CARRYING OUT THE METHOD

The present invention relates to a control method and a shift register for carrying out the control method for use with an intermittently moving mechanism which can accurately perform quality inspection of various articles such as bottles or cans molded of synthetic resins, metals or the like. For example, inspecting for outer surface flaws, for air-tightness, for dimension, for strength and the like can be accurately performed in the intermittently moving mechanism in addition to operations such as attaching of labels, mounting of caps and the like.

In past mechanisms for intermittently moving products in inspecting or machining operations, an inspection mechanism has been arranged to issue an inspection result signal during the "stop period" of the mechanism. During the "operating period" of the intermittently moving mechanism, in accordance with the issuance of this signal, the desired operation was performed, such as removal of a defective product.

Therefore, in the case where a plurality of different inspections were made of one product, such as inspection of the neck, of the body, and of the bottom, the defective product as determined by the respective inspections had to be removed from the intermittently moving mechanism in that step of inspection or in the subsequent step of inspection. This resulted in the provision of a multitude of steps and a multitude of product removal outlets in the intermittently moving mechanism; and hence, the construction of uselessly complicated apparatus.

Further, if the apparatus was designed to deliver the products to the final step, regardless of their quality, the reception of signals indicating the good or bad products at the time of the final step and the operation to be performed was subject to considerable time restriction (time capable of permitting entry of instruction signals was extremely short). In consequence, it was hard to adjust timing between mechanical operations and electrical signals, and the operation of the intermittently moving mechanism often was poor.

In addition, if an ordinary shift register were mounted on the intermittently moving mechanism, the obtained inspection results would shift to the final step without modification, such that an article which was not completed in one step but was finished in the succeeding step would still have a signal representative of incompletion moving in correspondence with it regardless of the fact that the product is already finished.

For this reason, intermittently moving mechanisms adapted to effect the operations described inevitably use a plurality of independent shift registers, necessitating an electronic device of large capacity or an intermittently moving mechanism for each operation.

It is therefore an object of the present invention to provide a control method for an intermittently moving mechanism and a shift register for carrying out the control method, and more particularly, to provide for such a mechanism for moving a product intermittently to inspect or machine the product, wherein pieces of information relative to the state of the product are successively shifted so as to follow the movement of the intermittently moving product, and wherein "work signals" may be freely switched in for registering the state of a number of products which are simultaneously handled in the mechanism regardless of the operation timing of the intermittently moving mechanism.

It is another object of the present invention to utilize a "clear signal" from a power source in synchronism with a "shift signal" from a shift generator to thereby effect a different inspection or machining operation at each step of the intermittently moving mechanism and to obtain outputs at each step based on the inspection or machining operation.

The above and further objects and novel features of the invention will more fully appear from the following detailed description of preferred embodiments when the same is read in connection with the accompanying drawings. It is to be expressly understood, however, that the drawings are for purpose of illustration only and are not intended as a definition of the limits of the invention.

In the drawings:

FIG. 1 is a plan view showing a typical turntable of an intermittently moving mechanism embodying the present invention and illustrating a stopped position of the turntable for purpose of explaining the operation of the present invention; and FIG. 2 is a schematic diagram showing the electric wiring of a shift register in accordance with the present invention.

The present invention has been achieved in an effort to overcome the above noted disadvantages and problems with respect to the control methods and control circuitry in the intermittently moving mechanisms of prior art. It provides an arrangement where a "shift signal" divided into a "moving signal" and a "stopping signal" to correspond to the moving time and stopping time of the intermittently moving mechanism is always available regardless of the presence or absence of a "work signal", and wherein a "work signal" may be added to said "shift signal" to generate an "output" that is thereby shifted in time with the movement of the product. This "shift signal" thereby renders input timing for the "work signal". Where the "output signal" is not required to be shifted, the "output signal" may be extinguished by a "clear signal".

Before a detailed description of the present invention is given, reference is made to FIG. 1, which is the plan view of a turntable in an intermittently rotated mechanism KD. A prime shaft GK, rotated at a constant speed by means of a drive source such as a motor, is converted into intermittent rotating operation by means of Geneva mechanism or the like to cause this intermittent rotation.

That is, the product having been positioned on the turntable at position 1 is intermittently rotated to position 2, and said operation is successively repeated in accordance with the operation of the prime rotating shaft GK and the geneva mechanism to intermittently rotate the turntable, whereby the product held on the turntable is displaced from one position to the other, and the desired operation such as inspection or machining is applied to the product in a predetermined stopped position or moving position.

The product transported in turntable has a stopped mode and a moving mode within a period of one rotating operation of the prime shaft GK such that turntable KD is stopped for a predetermined period of time at a predetermined position and is moved at a constant speed to a succeeding predetermined position for the remaining time within a period of one rotating operation of the prime rotating shaft GK.

A "shift signal", which is the most important basic signal in the present invention, is obtained in accordance with the rotation of shaft GK. Referring to FIG. 2, a cam disc CM for setting a stopping period and a moving period of the intermintly moving mechanism KD is mounted on shaft GK, and a detection switch, such as a lead switch or limit switch, is suitably mounted in the vicinity of the cam disc CM so that a switching state may be reversed according to the stopping period and moving period of the intermittently moving mechanism KD.

A shift signal generater SH is provided to divide the "shift signal" from the detection switch into a "moving signal" and a "stopping signal", one appearing on line $L_1$ directly from an amplifier $AM_1$ and the other appearing on line $L_2$ from an amplifier $AM_2$ through an inverting circuit.

For example, during the stopping period of the turntable KD, cam disc CM turns on detection switch DS and causes the "shift signal", now referred to as the "moving signal", to appear on line $L_1$; conversely, when detection switch DS is turned off, the "shift signal", now referred to as the "stopping signal", appears on line $L_2$.

The signals appearing on lines $L_1$ and $L_2$ from the shift signal generator SH are entered into a shift curcuit SC which provides an "output signal" when the "shift signal" and a "work signal" (later described) are simultaneously entered; this "output signal" is shifted in accordance with the "shift signal", that is, in accordance with the operation of the intermittently moving mechanism KD.

The shift circuit SC has process blocks KB corresponding to respective operating processes of the intermittently moving mechanism KD, these process blocks being successively connected in series in accordance with the operating order of the intermittently moving mechanism KD.

Each process block KB, except for the first and last process blocks, consists of a first block portion $B_1$ corresponding to the stopping period (or moving period) of the turntable and a second block portion $B_2$ corresponding to the moving period (or stopping period) following the first period. Both the block portions $B_1$ and $B_2$ are designed so that an AND circuit ($AND_1$), into one input terminal of which is entered an output of an OR circuit having two input terminals, has its output entered into a "set" block a of a flip-flop circuit FF, whereas the other AND circuit ($AND_2$), having two input terminals, has its output entered into a "clear" block b of the flipflop circuit FF.

In the illustrated embodiment, an "output signal" from the flip-flop circuit of the preceding process block KB is entered through one input terminal of the circuit OR into one terminal of AND circuit ($AND_1$) of block portion $B_1$, and the remaining input terminal of this AND circuit is connected to line $L_1$ to receive a shift signal. One input terminal of the AND circuit ($AND_2$) is connected to receive a shift signal from line $L_2$. An output from the flip-flop circuit FF in block portion $B_1$ is entered into the next block portion $B_2$.

Entered into the remaining input terminal of the AND circuit $AND_2$, in block portions B is any output from the flip-flop circuit FF of the second successive block portion B. Further, a "work signal" may be entered into the remaining input terminal of the OR circuit in each block portion B.

Regarding the first and last process blocks, it will be noted in the illustrated embodiment that no OR circuit is provided in block portion $B_1$ of the first process block KB and in block portion $B_2$ of the final process block KB.

The "work signal" entered into block portion $B_1$ or block portion $B_2$ in each process block KB is generated on the basis of the same purpose. For example, the "work signal" is generated when the product, which is intermittently moving with the turntable KD, has some defect; said "work signal" serves as an inspection result signal.

However, a "first work signal" entered into block portion $B_1$ of the first process block KB is the most basic detection signal and is for detecting whether or not the product is held in proper position on the intermittently moving mechanism KD. "First work signal" generating portion WS is directly connected in the circuit of the present invention.

In the illustrated embodiment, the "work signals" are entered into the respective process blocks KB through respective switches SW from line $L_3$ which is connected to a power source. Inputs of the "work signals" to process blocks KB, with the exception of the first and last process blocks KB, are either into block portions $B_1$ or into block portions $B_2$ through change-over switches KSW, instead of being entered simultaneously into both block portions $B_1$ and $B_2$.

The "work signal" is selectively cut-in during the stopping period or moving period in each process operation, but this selection is determined according to the nature of the "work signal" entered and the purpose of any external output due to the "work signal".

Further, connected to the "clear" block b of the flip-flop circuit FF in each block portion B is a line $L_4$ from the power source through a clear switch KS. This line $L_4$ is provided so that the clear switch KS (one shot switch) may be turned on to render all flip-flop circuits FF inoperable, so that there is no output.

Line $L_4$ is variously used. One method of use is that the entire shift circuit SC is placed in a state of no output; that is, a waiting state, before starting the turntable. In another method, the shift circuit SC will not shift the output as the product moves; rather, some kind of operation responds to a "work signal" entered into one or more process blocks KB during the respective process periods of the intermittently moving mechanism. That is, a "work signal" is entered into block portion $B_1$ of a process block KB in accordance with a certain product inspection; when an output from block portion $B_1$ is present, an operation in accordance with this "work signal" is effected, such as discharge of a defective product, within the period of block portion $B_2$. At the time of completion of block portion $B_2$, the "clear signal" is applied through line $L_4$ to the flip-flop circuits FF in both block portions B to permit the output of that process block KB to assume zero and an output is not transmitted to the succeeding process block KB. In this case, strictly speaking, circuit SC does not constitute a shift circuit.

Connected to the output terminals of both block portions B in the process blocks KB, i.e, the output terminals of the flip-flop circuits FF, are external output lines, to transmit these "output signals" to external output portions GS through change-over switches KSW.

Each external output portion GS is provided to effect an operation in response to a "work signal". In the illustrated embodiment, an output signal is entered into a relay through an amplifier. Actuation of the relay will permit an opening mechanism to effect the desired operation.

In the illustrated embodiment, the external output portion GS is provided in each process block KB. However, it may be eliminated, as necessary, and is not always required in all the process blocks KB.

Next, the operation of the circuit in accordance with the present invention will be described by way of preferred embodiments.

Operation With Good Product

The first process block $KB_1$ in the shift circuit SC shown in FIG. 2 corresponds to position 1, of FIG. 1, at which the product is fed to and held on the turntable. The block $B_1$ corresponds to the stopped period when a product holding portion of the turntable is stopped at position 1, and block $B_2$ corresponds to the moving period during which the product holding portion is moved from position 1 to position 2.

Similarly, the second process block $KB_2$ corresponds to position 2, the third process block $KB_3$ to position 3, and the fourth process block $KB_4$ to position 4.

Position 2 is for quality inspection of the neck of the product. Position 3 is for quality inspection of the body of the product. A "work signal" is entered into the second process block $KB_2$ corresponding to position 2 and the third block $KB_3$ corresponding to position 3 only when the product is defective.

Connected to the first process block $KB_1$ is the "first work signal" generator WS which indicates whether or not the product is properly fed to and held on the turntable. When the product is improperly fed to and held on the turntable, the "first work signal" is generated.

When the product holding portion is stopped at position 1 during intermittent rotation of the turntable, the "shift signal" is fed from the shift signal generator SH to line $L_1$ and entered into one input terminal of the AND circuit ($AND_1$) in block $B_1$ of the first process block $KB_1$. At the same time, a product is fed to this product holding portion from a feed mechanism.

Position 1—Proper Feed And Hold Of Product

When the product is properly fed to and held on the product holding portion stopped at position 1, the "first work signal" is not generated by generator WS. Hence, no input is entered into the remaining input terminal of the AND circuit ($AND_1$) in block $B_1$ of the first process block $KB_1$, so that no output issues from this block $B_1$.

When the product holding portion, now at position 1, starts to move, the "shift signal" is fed to line $L_2$ and entered into the AND circuit ($AND_1$) of block $B_2$. However, since there is no output from block $B_1$, or switch $SW_1$, there is no input to block $B_2$ whereby the flip-flop circuit FF in block $B_2$ is not "SET", and produces no output. Namely, there is no output from the first process block $KB_1$.

Position 2—Neck Inspection of Product

When the product is stopped at position 2, the shift signal is again generated and fed from the shift signal generator SH to line $L_1$ and applied to one input terminal of the AND circuit ($AND_1$) of block $B_1$ of the second process block $KB_2$. Since no output from the first process block $KB_1$ is present, no input is shifted to the OR circuit. If the neck of the product has been found to be good, a "work signal" is not generated. That is, switch $SW_2$ located in the line that connects the second process block $KB_2$ to line $L_3$ is not closed, such that a "work signal" is not passed to the OR circuit. The product stopped at position 2 starts to move to position 3, an output is not released from the second block $B_2$, and the second process block $KB_2$ has no output.

Position 3—Body Inspection of Product

If the product is stopped at position 3 and the body of the product is found to be "good", no output is released from the third process block $KB_3$ similar to the previous case.

Position 4—Discharge of Good Product

Thus, when the product is stopped at position 4, which is the position for discharging the good product, there is no input to process block $KB_4$ from process block $KB_3$ or $SW_4$. The product is carried out from the turntable in accordance with a preset basic program.

That is, when the good product is carried into the intermittent moving mechanism KD, the process blocks KB in the shift circuit SC release no output and zero outputs are successively shifted through the process blocks KB with the good products.

Position 1—Operation With Defective Product

If the product is not properly fed to and held on the product holding portion of the turntable at position 1, a "work signal" is entered into the remaining input terminal of AND circuit ($AND_1$). Thus, an output is released from the AND circuit ($AND_1$) causing the flip-flop circuit FF in the block $B_1$ to be "SET" and releasing an output from block $B_1$. The output from block $B_1$ is entered into AND circuit ($AND_1$) in block $B_2$ through the OR circuit.

When the product holding portion starts to move to position 2, the shift signal on line $L_2$ is also entered into AND circuit ($AND_1$) in block $B_2$ whereby the flip-flop circuit FF is "SET" to release the output from block $B_2$.

Position 2

The "output signal" of the first process block $KB_1$ is entered into block $B_1$ of the second process block $KB_2$. At the same time, it is fed back and entered into one input terminal of the AND circuit ($AND_2$) of block $B_1$ of the first process block $KB_1$. Since the "shift signal" from the line $L_2$ is being entered into the other input terminal of this AND circuit ($AND_2$), and output causes flip-flop circuit FF in block $B_1$ of process block $KB_1$ to be "CLEARED" and thereby cut off the output from this block $B_1$.

Next, when the product is stopped at position 2, the "shift signal" is fed through line $L_1$ into one input terminal of AND circuit ($AND_1$) of block $B_1$ of process block $KB_2$. Since the "output signal" from preceding process block $KB_1$ is entered into the other input terminal of the AND circuit ($AND_1$) through the OR circuit, an output is released and causes the flip-flop circuit FF in block $B_1$ to be "SET" to generate the "output signal".

When the "output signal" is generated from block $B_1$ in process block $KB_2$, this output signal is entered into the succeeding block $B_2$ and at the same time fed back and entered into the preceding block B, that is, into AND circuit ($AND_2$) in block $B_2$ of process block $KB_1$ to permit an output from the AND circuit ($AND_2$) which has already received the shift signal from line $L_1$.

Thus, the flip-flop circuit in block $B_2$ of the process block $KB_1$ is "CLEARED" to cut off the output from block $B_2$.

In this manner, the "first work signal" generated from the "first work signal" generator WS in accordance with the intermittent movement of the turntable, that is, the signal representative of a state where the product is not properly retained on the corresponding product holding portion is shifted as the product holding portion moves and at the same time, the thus shifted "output signal" is fed back to the preceding block B to thereby "clear" the flip-flop circuit FF in the preceding block B to the waiting state.

Further, in the event the neck is defective when the product is stopped at position 2 in the illustrated embodiment, switch $SW_2$ which connects line $L_3$ to process block $KB_2$ is actuated to apply the "work signal" representative of "bad neck" to the OR circuit in block $B_2$ of the process block $KB_2$.

When the product starts to move to position 3, the shift signal appears on line $L_2$. This "shift signal" and the "work signal" from line $L_3$, due to a defective neck, are applied to AND circuit ($AND_1$) in block $B_2$ of process block $KB_2$ so that flip-flop circuit FF of block $B_2$ is "SET" generating an output signal from block $B_2$ of process block $KB_2$.

Position 3

Furthermore, in the event the product fed to the turntable has a defective body, a signal is not generated until the product reaches position 3. At that time, switch $SW_3$ connects line $L_3$ to process block $KB_3$ to apply the "work signal" through an OR circuit to AND circuit ($AND_1$) in block $B_2$ of process block $KB_3$.

In consequence, when the product starts to move from position 3 to position 4, the "shift signal" from line $L_2$ is entered into the other input terminal of AND circuit ($AND_1$) in block $B_2$ of process block $KB_3$, into one input terminal of which is already entered the "work signal" due to the defective body. Hence, the "output signal" is shifted to process block $KB_4$ in accordance with the operation of the turntable.

Positions 4 and 5

That is, where the product is improperly fed to and held on the product holding portion, has a defective neck, has a defective body, or where the turntable for carrying the good product from the position to position 4 is inconvenienced because of various reasons just mentioned above, an "output signal" representative of such defects is released, and this "output signal" is shifted through process blocks KB in accordance with the intermittent movement of the product until it reaches process block $KB_4$ corresponding to position 4, which is the position for discharging a good product. Thus, removal of a defective product at position 4 is stopped due to the shifted "work signal" and the defective product is either discharged at position 5, or a counter for counting the number of good products discharged at position 4 is halted.

These operations of removing a defective product at position 5 instead of at position 4, or of stopping the counter of good products may be accomplished by issuing instructions from an external output GS.

SWITCH KSW

Timing of the input of the "work signal" is not limited to that already described. Change-over switches KSW in series with the switches SW between line $L_3$ process blocks KB may be reversed whereby the "work signal" may be entered during the stopping period of the turntable.

That is, the "shift signal" is applied to the process blocks KB during the stopping period and the moving period, and the "output signal" is generated as long as both the "shift signal" and "work signal" are applied.

While the above description has been given of the operation of only one product holding portion of the turntable, a number of product holding portions are simultaneously operated. When a certain product is in a stopping period, other products are similarly in their stopping positions. Conversely, when a certain product is being moved, other products are also being moved. Therefore, considering the adjacent product holding portions, when a product is stopped in a predetermined position, that is, it is opposed to block $B_1$ of process block $KB_n$ then the preceding product is opposed to block $B_1$ of process block $KB_{(n-1)}$.

Accordingly, if the "output signal" due to some defect is shifted from process block $KB_{(n-1)}$ to $KB_n$ in accordance with the intermittent movement of the turntable, a part of this "output signal" from block $B_1$ of process block $KB_n$ causes block $B_2$ of process block $KB_{(n-1)}$ to be "CLEARED" to the "waiting state".

In the foregoing, the operation for successively shifting "output signals" generated by "work signals" on the basis of some purpose has been described. However, by utilization of line $L_4$ (in the form of a clear line), all of the flip-flops FF may be placed in the waiting state, and the circuit of the present invention is not used as a shift register for the "output signal" but may be used for an application in which each process block KB is operated, corresponding to a "work signal", entirely differently from the other process blocks KB. In the event an "output signal" is generated, it is not shifted to the following process block KB.

Such a method may advantageously be used for an intermittently moving mechanism KD, which is designed to inspect the state of products and to apply a machining or other operations to the product, instead of merely to inspect the products being intermittently moved.

For example, where mounting of a cap on a product at position 2 has not been achieved, the fact that the operation of mounting the cap has been unsuccessful is detected and switch $SW_2$ is actuated such that the "work signal" is passed to block $B_2$ of process block $KB_2$. When the product starts to move towards position 3, the "shift signal" on line $L_2$ and the "work signal" are applied to block $B_2$ of process block $KB_2$ so that an "output signal" if fed to external output $GS_2$ whereby a mechanism for mounting the cap on the product at position 3 is operated.

Immediately before the product reaches the position 3, that is, immediately before termination of the moving period, clear switch KS is actuated to "CLEAR" flip-flop circuits FF in the blocks B. That is, block $B_2$ of process block $KB_2$ is brought into the inoperable state immediately before the product reaches position 3.

What is claimed is:

1. A control method for commands for an intermittently moving mechanism for inspecting and machining products while said mechanism is being intermittently moved through a plurality of stations, comprising the steps of:

(a) providing alternately occuring shift signals, one of said shift signals corresponding to the moving period of said intermittent mechanism and the other of said shift signals corresponding to the stopping period of said intermittent mechanism, to a plurality of sequentially connected process blocks respectively corresponding to said plurality of stations, said process blocks having connected first and second block portions to form a plurality of sequentially connected block portions;

(b) selecting said first block portion or said second block portion of said process blocks for reception of a work signal;

(c) providing said work signal to the selected block portion of a process block upon the occurrence of a process at the station corresponding to said process block;

(d) entering said work signal into said selected block portion upon the occurrence of said one shift signal to produce outputs of said selected block portion of an output signal to the next succeeding block portion and of a feedback signal to the next preceeding block portion; and (e) cancelling any outputs of said next preceeding block portion by said feedback signal upon occurrence of said other shift signal.

2. A control method as in claim 1, further comprising the steps of:

(f) providing a constant speed rotation to a prime shaft and converting said rotation to said intermittent movement through a geneva gear; and (g) providing a clear signal to said block portions for eliminating said outputs from said block portions.

3. A control method for commands for an intermittently moving mechanism for inspecting and machining products while said mechanism is being intermittently moved through a plurality of stations, comprising the steps of:

(a) providing alternately occurring shift signals, one of said shift signals corresponding to the moving period of said intermittent mechanism and the other of said shift signals corresponding to the stopping period of said intermittent mechanism;

(b) selecting a connected first block portion or second block portion, of one of a plurality of sequentially connected process blocks respectively corresponding to said plurality of stations, for reception of a work signal;

(c) providing a work signal at one of said stations upon the occurrence of a process at said station;

(d) feeding said work signal to a first gate of said selected block portion;

(e) feeding said one shift signal to said first gate of said selected block portion and to a second gate of the next adjacent block portion;

(f) feeding said other shift signal to a second gate of said selected block portion and to a first gate of the next adjacent block portions;

(g) gating said work signal into said selected block portion through said first gate upon the occurrence of said one shift signal to produce outputs of said selected block portion of an output signal to the first gate of the next succeeding block portion and of a feedback signal to the second gate of the next preceeding block portion;

(h) gating said feedback signal into said second gate of said next preceeding block portion upon the occurence of said other shift signal to cancel any outputs from said next preceeding block portion; and (i) gating said output signal into said next succeeding block portion upon the occurrence of said other shift signal.

4. A shift register circuit for an intermittently moving mechanism comprising:

(a) a shift signal generator for feeding a shift signal to one line during a moving period of said intermittently moving mechanism and to another line during a stopping period of said intermittently moving mechanism in accordance with a disc cam mounted on a prime rotating shaft;

(b) a plurality of sequentially connected process blocks respectively corresponding to a plurality of processes of said intermittently moving mechanism, each process block comprising a first block portion and a second block portion;

(c) two sequentially connected block portions of each of said process blocks, to form a string of adjacent block portions in said shift register circuit, each of said block portions connected to said lines for receiving said shift signal;

(d) selection means for connecting a work signal line to a selected one of said two connected block portions of each of said process blocks;

(e) a work signal generated upon the occurrence of a process corresponding to a process block;

(f) output and feedback signals generated by said selected block portion upon the simultaneous occurrence of said shift signal on said one line and of a work signal on said work signal line, said selected block portion adapted to feed said output signal to the next succeeding block portion of said string of block portions and to feed said feedback signal to the next preceeding block portion of said string of block portions upon the occurrence of said shift signal on said other line to cancel any output signal and feedback signal generated by said next preceeding block portion.

5. A shift register as in claim 4, at least one of said block portions further comprising:

(a) an OR circuit having a work signal input terminal connected to said work signal line and an output signal input terminal connected to said next preceeding block portion and adapted to generate a defect signal upon the occurrence of a work signal or an output signal at either of said input terminals of said OR circuit;

(b) an AND circuit having a defect signal input terminal and a shift signal input terminal and adapted to gate said defect signal to a flip-flop circuit upon the simultaneous occurrence of said shift signal on said one line and said defect signal;

(c) a second AND circuit having a feedback signal input terminal and a shift signal input terminal and adapted to generate a cancel signal to said flip-flop circuit upon the simultaneous occurrence of said shift signal on said other line and said feedback signal at the inputs of said second AND circuit;

(d) SET and CLEAR input terminals of said flip-flop circuit respectively adapted to receive said defect signal and said cancel signal, said flip-flop adapted to generate said output and feedback signals when said defect signal is generated and said cancel signal is not generated and to cancel said generated output signal when said cancel signal is generated.

6. A shift register as in claim 4, further comprising:

(a) clear line connected to said block portions and adapted to convey a clear signal to said block portions to cancel said output and feedback signals upon command.

7. A shift register as in claim 4, wherein said output signal is also fed to a relay circuit.

* * * * *